United States Patent
Fujita et al.

(10) Patent No.: US 9,307,005 B2
(45) Date of Patent: Apr. 5, 2016

(54) COMMUNICATION CONTROL SYSTEM, METHOD, AND APPARATUS

(71) Applicant: Fujitsu Limited, Kawasaki-shi, Kanagawa (JP)

(72) Inventors: Daisuke Fujita, Akashi (JP); Minoru Inoue, Himeji (JP); Kazuhiko Horiuchi, Hashimoto (JP); Takahiro Takenaka, Kobe (JP); Masayuki Kawashima, Kako (JP); Naoyuki Kodama, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 334 days.

(21) Appl. No.: 13/848,814

(22) Filed: Mar. 22, 2013

(65) Prior Publication Data

US 2013/0282816 A1    Oct. 24, 2013

(30) Foreign Application Priority Data

Apr. 20, 2012  (JP) ................................. 2012-097162

(51) Int. Cl.
  *G06F 15/16*   (2006.01)
  *H04L 29/08*   (2006.01)
  *H04L 29/14*   (2006.01)

(52) U.S. Cl.
  CPC ................ *H04L 67/02* (2013.01); *H04L 69/40* (2013.01); *H04L 67/06* (2013.01)

(58) Field of Classification Search
  CPC ......... H04L 67/02; H04L 69/40; H04L 67/06; H04L 29/08
  USPC .................................. 709/204, 213, 216, 232
  See application file for complete search history.

(56) References Cited

U.S. PATENT DOCUMENTS

| | | | |
|---|---|---|---|
| 2002/0116566 A1* | 8/2002 | Saida | 710/313 |
| 2005/0201375 A1* | 9/2005 | Komatsu et al. | 370/389 |
| 2006/0248218 A1* | 11/2006 | Kuribayashi | 709/232 |
| 2008/0172392 A1* | 7/2008 | Crichton et al. | 707/10 |

FOREIGN PATENT DOCUMENTS

| | | |
|---|---|---|
| JP | 2-157942 | 6/1990 |
| JP | 6-301608 | 10/1994 |

(Continued)

OTHER PUBLICATIONS

Office Action issued Dec. 1, 2015 in Japanese Patent Application No. 2012-097162 (with partial English translation).

*Primary Examiner* — Cheikh Ndiaye
(74) *Attorney, Agent, or Firm* — Oblon, McClelland, Maier & Neustadt, L.L.P.

(57) ABSTRACT

A communication control system includes a first computer and a second computer, wherein the first computer includes a communication interface device and a first processor configured to control the communication interface device to transmit first data and first feature information indicating a feature of the first data to the second computer, and the second computer includes a memory that has a storage area allocated to store second data received from the first computer, and a second processor configured to determine whether the first feature information received from the first computer matches second feature information, indicating a feature of and calculated based on the second data stored in the storage area, and control the memory to release the storage area when the second feature information does not match the received first feature information.

20 Claims, 9 Drawing Sheets

(56) References Cited

FOREIGN PATENT DOCUMENTS

| JP | 2000-172539 | 6/2000 |
| JP | 2002-051100 A | 2/2002 |
| JP | 2002-506246 A | 2/2002 |
| JP | 2002-073453 A | 3/2002 |
| JP | 2006-276981 A | 10/2006 |

* cited by examiner

COMMUNICATION CONTROL SYSTEM, METHOD, AND APPARATUS

CROSS-REFERENCE TO RELATED APPLICATION

This application is based upon and claims the benefit of priority of the prior Japanese Patent Application No. 2012-097162, filed on Apr. 20, 2012, the entire contents of which are incorporated herein by reference.

FIELD

The embodiments discussed herein are related to control of communication.

BACKGROUND

Data missing may possibly occur in a file being transferred using transmission control protocol (TCP) as the transport layer communication protocol and file transfer protocol (FTP) as the application layer communication protocol. Term "data missing" in the context of this disclosure refers to the phenomenon in which only a part of a file is sent from the sending-side computer to the receiving side and the receiving-side computer recognizes the received part as the entire file. There is a method, therefore, for detecting data missing by exchanging status notification of the normal/abnormal end of file transfer between the sending and receiving sides after the file is transferred.

After receiving a file through a data transfer process, the receiving-side computer closes the received file and releases the buffer in which the received file has been stored. When receiving a status notification of an abnormal end from the sending-side computer, the receiving-side computer discards the closed file. If the status notification of the abnormal end is received before the received file is closed, the receiving-side computer may release the buffer without closing the file. Even if the sending-side computer sends a status notification upon completion of a data transfer process, the status notification of an abnormal end may occasionally be delayed and arrive at the receiving-side computer after a file closure process has completed. While the file closure process is in progress, the buffer remains allocated to store the received data. For example, Japanese Laid-open Patent Publication No. 06-301608, Japanese Laid-open Patent Publication 2000-172539 and Japanese Laid-open Patent Publication 02-157942 are issued.

SUMMARY

According to an aspect of the invention, a communication control system includes a first computer and a second computer, wherein the first computer includes a communication interface device and a first processor configured to control the communication interface device to transmit first data and first feature information indicating a feature of the first data to the second computer, and the second computer includes a memory that has a storage area allocated to store second data received from the first computer, and a second processor configured to determine whether the first feature information received from the first computer matches second feature information, indicating a feature of and calculated based on the second data stored in the storage area, and control the memory to release the storage area when the second feature information does not match the received first feature information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a computer (sending side) transfers a file to another computer (receiving side), a file transfer process takes place using FTP, for example, as the application layer protocol. In the file transfer process using FTP etc., TCP, for example, may be used as the transport layer protocol.

Figure 1:
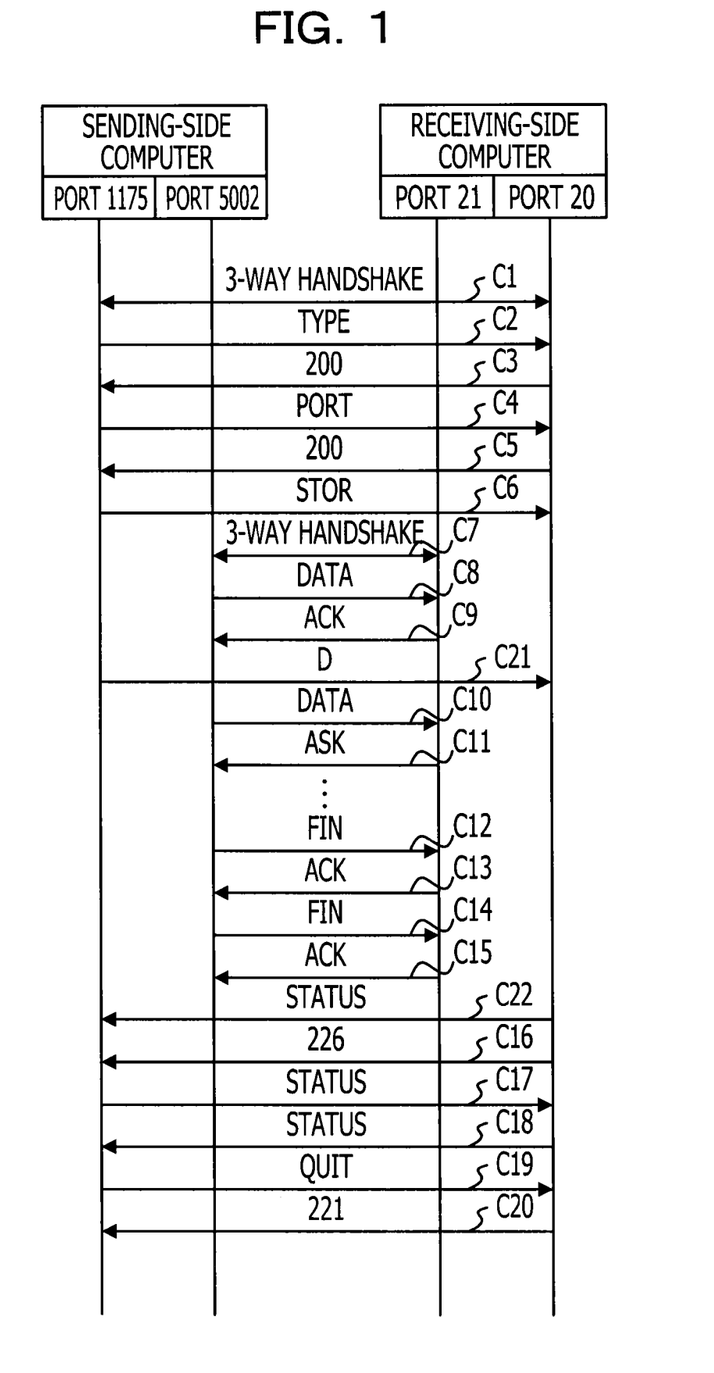
FIG. 1 illustrates a sequence diagram of a file transfer process.

FIG. 1 illustrates an exemplary file transfer process. In this figure, there is illustrated a process for uploading a file in the stream mode.

First, a control connection is established between sending-side and receiving-side computers (C1). In C1, the control connection is established following the 3-way handshake procedure. Description of an authentication procedure to the receiving-side computer is omitted. The sending-side computer sends a command (TYPE) indicating the data type of the file to be sent (C2), and the receiving-side computer replies with a response code (200) notifying that the command has normally been accepted (C3). Then, the sending-side computer sends a command (PORT) specifying an IP address and port (C4) to place this port in a standby state. Term "port (or port number)" refers to a number identifying a program in the communication destination with which the computer establishes a data communication. Receiving the PORT command, the receiving-side computer replies with a response code (200) notifying that this command has normally been accepted (C5). Then, the sending-side computer uses a STOR command to send information of the file to be sent to the receiving-side computer (C6). Receiving the STOR command, the receiving-side computer requests the port specified by the PORT command to establish a data connection. Data transfer using this data connection is performed (C8-C15) according to the TCP procedure, for example.

Figure 2:
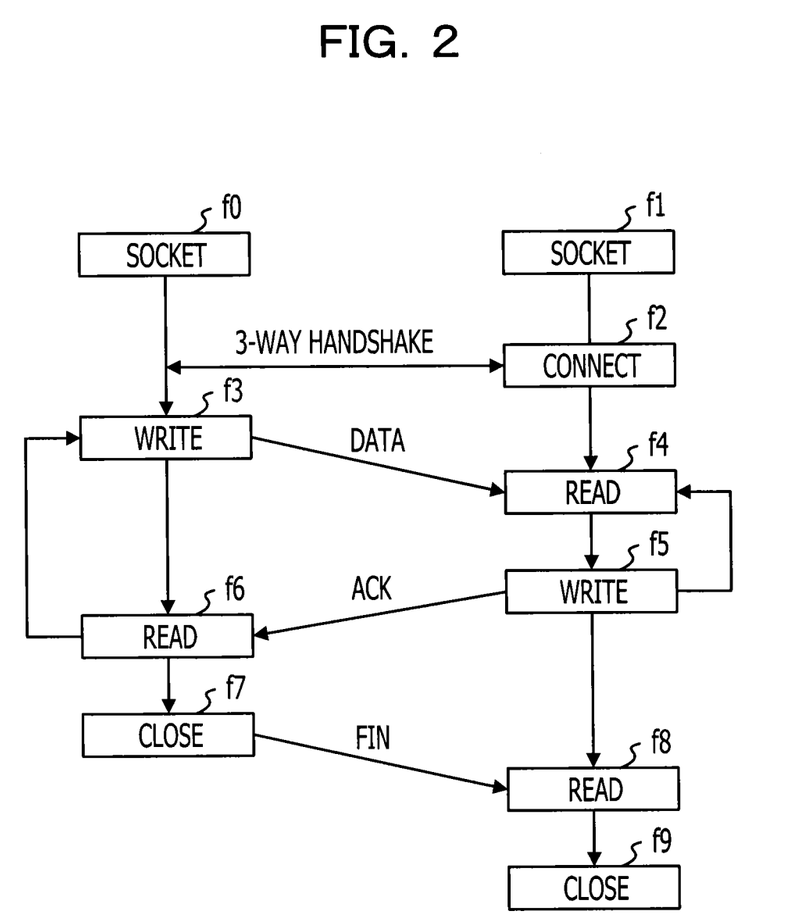
FIG. 2 illustrates a TCP-based sequence diagram.

FIG. 2 illustrates a TCP-based data transfer sequence. In the sending-side computer, functions (f0, f3, f6, f7) are invoked in the procedure illustrated in FIG. 2. In the receiving-side computer as well, functions (f1, f2, f4, f5, f8, f9) are invoked following the procedure illustrated in FIG. 2. This procedure will now be described in the order of steps. First, in the sending-side computer, when a file transfer is requested on the basis of an application program, a socket function is invoked and a socket is generated in the sending-side computer (f0). The socket is a virtual interface used by the application program for communication to deal with TCP. In the receiving-side computer as well, a socket function is invoked and a socket generated by the socket function is in a ready state (f1). Next, in the receiving-side computer, a connect function is invoked and a data connection is established between the sending-side and receiving-side computers according to the 3-way handshake procedure (f2). Subsequently, data included in the file to be sent is sent from the sending-side computer to the receiving-side computer.

Data sending is controlled by both computers as follows. First, in the sending-side computer, a write function (or a send function instead) is invoked. Then, data is copied from a buffer allocated to the application program in the sending-side computer to a sending buffer and the data copied to the sending buffer is sent to the receiving-side computer (f3). The receiving-side computer writes the received data into a receiving buffer. When the data is written into the receiving buffer in the receiving-side computer, in which a read function (or recv function instead) has been invoked, the data is read out of the receiving buffer and written into the buffer allocated to the application program operating in the receiving-side computer (f4). When the read function is executed, the receiving-side computer sends an ack to the sending-side computer. More specifically, an ack message is written into a sending buffer by a write function (f5). The sending-side computer writes the ack sent from the receiving-side computer into a receiving buffer. The sending-side computer, in which a read function has been invoked, reads the ack out of the receiving buffer (f6). When the ack is read out by the read function, the sending-side computer deletes from the sending buffer the data that has been sent and invokes again the write function to copy data from the buffer allocated to the application program to the sending buffer. The data included in the file to be sent is transferred from the sending-side computer to the receiving-side computer by repeating the above process.

When there remains no data to be read out of the buffer allocated to the application program, the sending-side computer invokes a close function (or shutdown function instead) to send information notifying the receiving-side computer of the end of data transfer (i.e., a message with a FIN flag set in the header) (f7). Receiving the message including FIN, the receiving-side computer writes 0-byte data into the receiving buffer. In the receiving-side computer, in which the read function has been invoked, the 0-byte data is read out (f8). Then, a close function is also invoked in the receiving-side computer (f9). When the close function is executed in the receiving-side computer, the receiving-side computer sends a message including FIN to the sending-side computer and the sending-side computer replies with ack.

When the TCP-based file transfer illustrated in FIG. 2 is carried out, the receiving-side computer sends a message (response code 226: transfer completed) notifying the sending-side computer of the end of data transfer according to the FTP procedure (C16). In the FTP procedure, after the message (response code 226: transfer completed) notifying of the end of data transfer is transmitted, a command (QUIT) indicating the end of communication is sent from the sending-side computer (C19). Receiving the QUIT command, the receiving-side computer replies with a response code (221: bye) acknowledging the end of communication (C20).

When a file is uploaded in the stream mode as illustrated in FIG. 2, the receiving side determines the end of the file to be received depending on whether or not the connection has been closed (0-byte data has been read out or not). The connection for file transfer is closed when a Close or Shutdown function is executed in the sending-side computer, for example. When a file is uploaded in this way, there is a risk that the file to be sent is only partially written into the buffer allocated to the application program operating in the sending-side computer due to an error arising during the data write operation, for example. As a result, the partial data written into the buffer allocated to the application program is sent to the receiving-side computer. If the connection is closed by the Close function invoked in the sending-side computer, the receiving-side computer determines that the received data constitutes the entire file to be received and proceeds to normal end.

Figure 3:
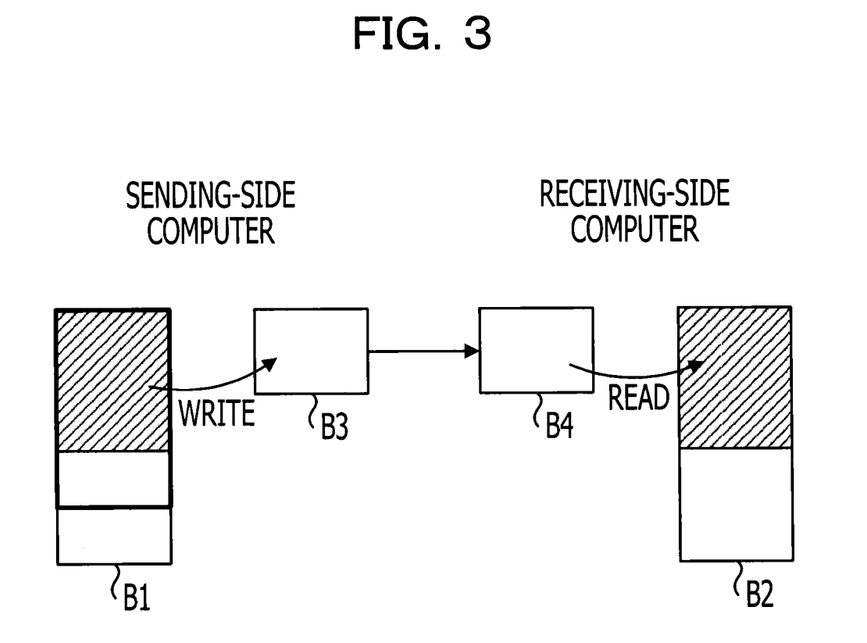
FIG. 3 illustrates the relationship between sending-side and receiving side buffer memories.

As illustrated in FIG. 3, for example, in the sending-side computer, a write function is executed to write the data included in the file (inside the thick line frame) stored in the buffer B1 allocated to the application program into a sending buffer B3. If only a part (indicated by hatching) of this file is written into the sending buffer B3 due to an error, only this part (indicated by hatching) of the file read out of the buffer B1 is written into the buffer B2 allocated to the application program in the receiving-side computer.

When the receiving-side computer determines that the data transfer process has successfully ended, the partially missing file due to the aborted communication is used for a process based on the application program in the receiving-side computer. When an error occurs and file resending is requested by the application program that has requested the file transfer, the sending-side computer performs a file resending process. This may cause a risk that the receiving-side computer performs processing a plurality of times using the same file received a plurality of times.

As a countermeasure, FTP is extended by adding steps to the communication procedure, for example. Steps (C17 and C18 illustrated in FIG. 1) are added, for example, to enable the sending-side and receiving-side computers to mutually notify of the status indicating whether or not the file transfer has normally ended (or whether or not it is determined that the file transfer has normally ended). With these additional steps, it is possible to avoid the risk that, although the sending-side computer determines that the file transfer has abnormally ended, the receiving-side computer determines that the file transfer has normally ended and performs processing using the received data.

A file closure error may possibly occur after the data transfer ends. However, a file closure error that has occurred in the computer on the other end of the communication is also detected by status notifications (C17 and C18 illustrated in FIG. 1) performed after the file is closed.

For example, if the sending-side computer sends to the receiving-side computer status information notifying of the normal end of processing in the sending-side computer, the receiving-side computer may confirm that the above risk has been avoided. For example, when the sending-side computer sends to the receiving-side computer status information notifying of the abnormal end of processing in the sending-side computer, the receiving-side computer may recognize that the above risk is present. On the contrary, when the receiving-side computer sends to the sending-side computer status information notifying the normal end of processing in the receiving-side computer, for example, the sending-side computer may confirm that it does not have to resend the file. When the receiving-side computer sends to the sending-side computer status information notifying of the abnormal end of processing in the receiving-side computer, for example, the sending-side computer may recognize that it has to resend the file.

When the status information notification itself is delayed, for example, the sending-side or receiving-side computer may not determine whether or not the file transfer process has normally ended and therefore may not end the file transfer transaction. If the status notification is delayed and does not arrive for too long a time, it is contemplated to send again a status notification before a predetermined time period elapses after the status information is sent, for example. In such a case, the file transfer transaction may not be ended until the predetermined time period additionally elapses. This means that, although the process is substantially completed, the receiving-side computer may not process the file received on the basis of the application program. Furthermore, the memory area (e.g., B2 illustrated in FIG. 3) allocated to the application program for the purpose of file transfer is not released.

When the sending-side computer sends a status notification indicating an abnormal end, for example, to the receiving side, the receiving-side computer eventually discards the file stored in the buffer allocated to the application program. Before receiving the status notification of abnormal end, the receiving-side computer may not determine whether or not the file transfer process successfully ends, so the receiving-side computer does not discard the file stored in the buffer allocated to the application program. If the status notification of abnormal end sent by the sending-side computer is delayed, the receiving-side computer does not discard the file stored in the buffer allocated to the application program during this delay.

As a countermeasure, the receiving-side computer receives, for example, information indicating features of the data included in the file from the sending-side computer (C21 illustrated in FIG. 1), in parallel with the file transfer process, before all the data contained in the file is completely transferred from the sending-side computer to the receiving-side computer. The receiving-side computer then calculates information indicating the features of the file to be received and compares the calculated feature information with the received feature information. As a result of the comparison, if the calculated feature information is different from the received feature information, there is a possibility of data missing and the receiving-side computer releases the buffer allocated to the application program. The receiving-side computer also sends an abnormal end status, for example, to the sending-side computer (C22 illustrated in FIG. 1). In this manner, when the transferred file is different from the file to be received due to data missing etc., load on the receiving-side computer may be reduced (memory area is released) early. In particular, it is possible to avoid the memory area in the receiving-side computer from being left allocated due to a delay in the status notification of abnormal end. The information indicating the features of the file to be sent includes, for example, the file size or a hash value obtained by substituting the file to be sent as an argument in a predetermined hash function.

There is also a method using both the status notification and the comparison of file feature amounts. When a status notification sent from the sending-side computer is delayed but the amounts of file features are identical, the sending-side computer may determine that the file transfer has normally ended and avoid the resending of status notification. This may also suppress the generation of a predetermined waiting time due to status resending.

In particular, if memory is left allocated to a communication with a client computer in a configuration in which files are uploaded from a plurality of client computers to a server computer and load is concentrated on the server computer, communications with other client computers will be delayed. By releasing the buffer memory, the server computer may use the released resource for other communications.

It may also be contemplated that a file F is sent a plurality of times and the receiving-side computer determines the success or failure of file transfer depending on whether or not the file F received a plurality of times is identical, for example. On the other hand, by sending the hash value based on the data in the buffer or the data size value, the amount of communication for the success/failure decision of file transfer may be reduced and thus fit in a narrow bandwidth allocated to the control connection in FTP. Since the communication for the success/failure decision of file transfer is established via the control connection, the bandwidth for data connection does not have to be significantly reduced.

According to the present embodiment, the buffer for storing the received file is not left allocated in the receiving-side computer even if an error occurs in the file sending-side computer.

Figure 4:
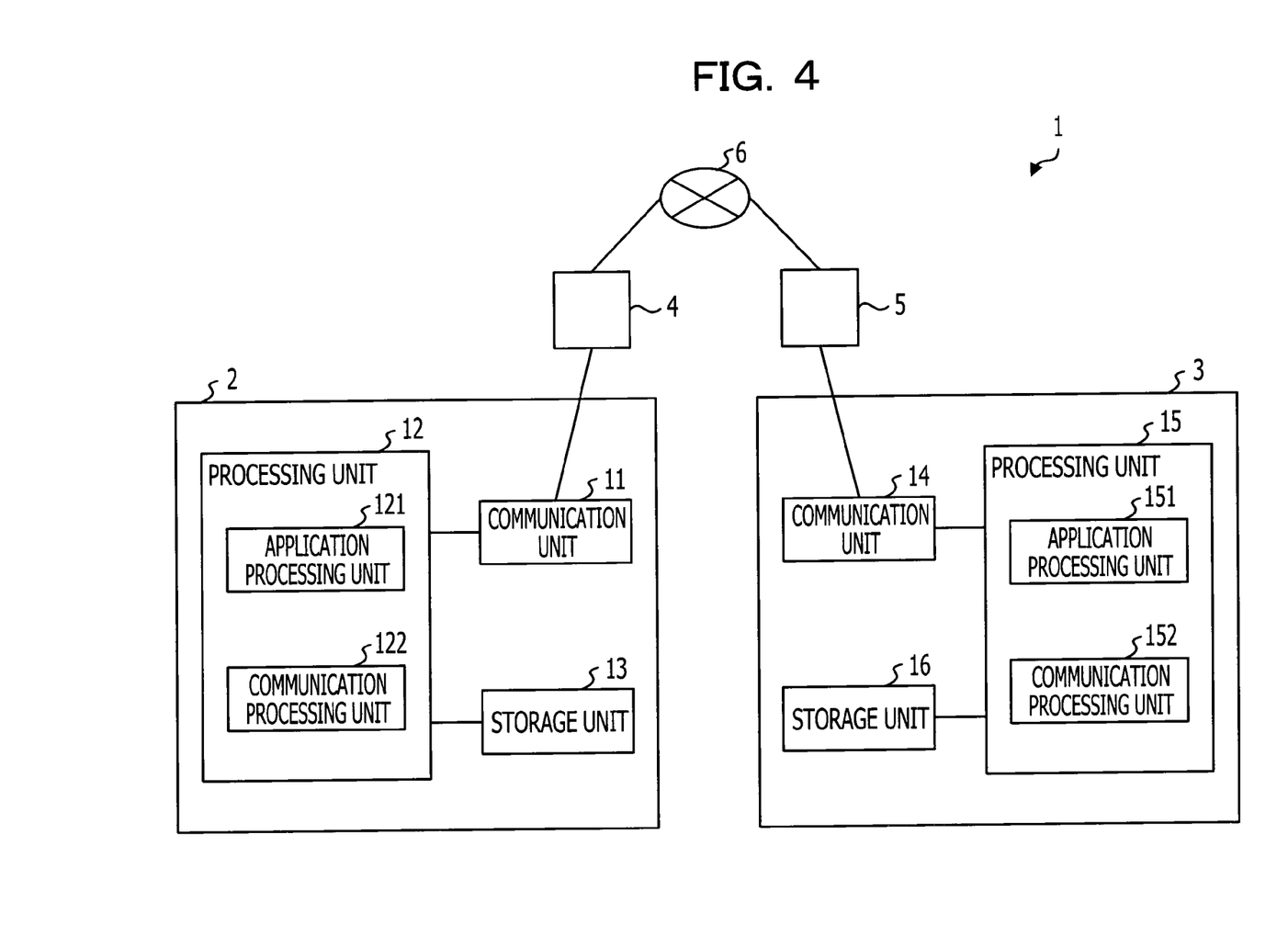
FIG. 4 illustrates an exemplary configuration of a system according to the present embodiment.

FIG. 4 illustrates an exemplary configuration of the communication system according to the present embodiment. The communication system 1 includes a sending-side computer 2 and a receiving-side computer 3 and communication is established therebetween. The sending-side computer 2 includes a communication unit 11, processing unit 12, and storage unit 13, while the receiving-side computer 3 includes a communication unit 14, processing unit 15, and storage unit 16. The processing unit 12 includes an application processing unit 121 and communication processing unit 122, while the processing unit 15 includes an application processing unit 151 and communication processing unit 152. Although one sending-side computer 2 and one receiving-side computer 3 are illustrated in FIG. 4, the number of sending-side and receiving-side computers is not limited thereto. If the sending-side computer 2 is a client and the receiving-side computer 3 is a server, for example, there may be a plurality of clients that send data to the server or there may be a plurality of servers such that any one of them may receive data from a client. The communication system 1 also includes relay devices 4, 5 and a network 6.

The communication unit 11 performs communication processing with other devices under the control of the processing unit 12. More specifically, under the control of the processing unit 12, the communication unit 11 reads data out of the storage unit 13 and sends the read-out data to a specified device. When receiving data, the communication unit 11 sends the received data to the processing unit 12. According to the program illustrated in FIG. 5, the processing unit 12 controls the communication unit 11 and storage unit 13 and performs arithmetic processing. The storage unit 13 writes or reads data according to instructions from the processing unit 12. The application processing unit 121 performs processing based on application programs (e.g., application program 23 and control program 24 illustrated in FIG. 5). When a communication is requested by the application processing unit 121, the communication processing unit 122 performs an arithmetic operation and controls the communication unit 11 on the basis of a communication control program (e.g., socket API 22c, protocol stack 22b, and device driver 22a illustrated in FIG. 5). The processing performed by the application processing unit 121 and communication processing unit 122 will be described later.

The receiving-side computer 3 has functions equivalent to the communication unit 11, processing unit 12, and storage unit 13 in the sending-side computer 2. The communication unit 14 performs processing similarly to the communication unit 11, the processing unit 15 performs processing similarly to the processing unit 12, and the storage unit 16 performs processing similarly to the storage unit 13.

The communication processing performed by the application processing units 121, 151 and communication processing units 122, 152 will now be described in more detail.

Figure 5:
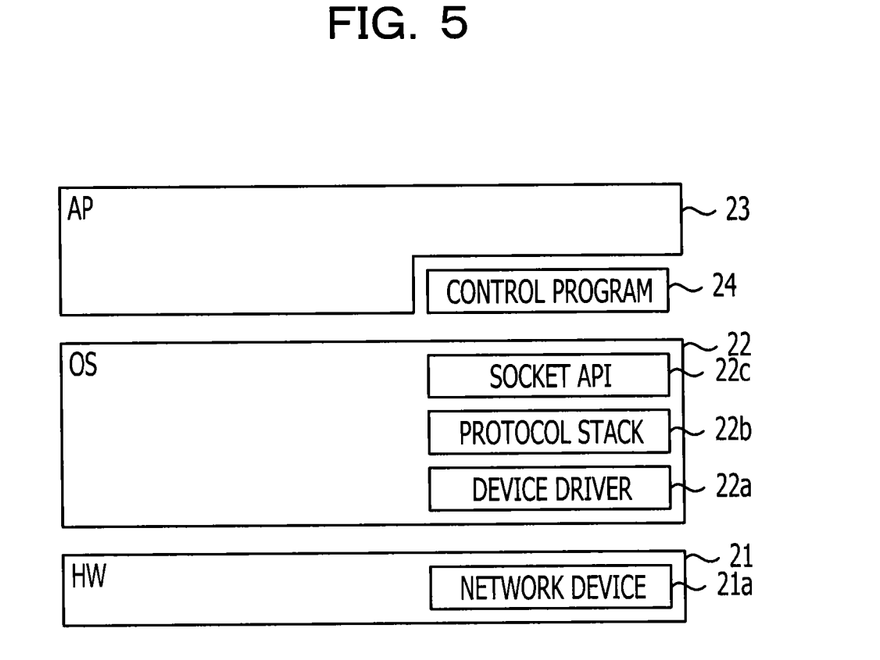
FIG. 5 illustrates an exemplary software configuration in the sending-side computer.

The application processing unit 121 performs processing based on the application program 23 and control program 24 illustrated in FIG. 5 as described above. For example, when the transfer of file F is requested on the basis of the application program 23, the application processing unit 121 requests the communication processing unit 122 to establish a control connection to the file transfer destination. The application processing unit 121 provides a buffer B1 in the storage unit 13 and writes the file F to be sent into the buffer B1. Then, the application processing unit 121 causes the communication processing unit 122 to perform processing following the procedure illustrated in FIG. 2. More specifically, the application processing unit 121 invokes socket function, connect function, write function, read function, close function, and so on in the order illustrated in FIG. 2. The communication processing unit 122 performs processing on the basis of each of the functions invoked by the application processing unit 121.

When the communication processing unit 152 establishes the data connection as the connect function is executed by the communication processing unit 122, the application processing unit 151 invokes the functions in the order illustrated in FIG. 2. Then, the application processing unit 151 provides a buffer B2 in the storage unit 16 to store the received data. More specifically, read function, write function, close function, and so on are invoked. The communication processing unit 152 performs processing on the basis of each of the functions invoked by the application processing unit 151. The communication processing unit 152 reads the received data out of the receiving buffer by executing the read function and stores the read-out data into the buffer B2.

When the above processing is performed by the application processing units 121, 151 and the communication processing units 122, 152, the file F stored in the buffer B1 in the sending-side computer 2 is transferred to the buffer B2 in the receiving-side computer 3.

After storing the file F to be sent into the buffer B1, the application processing unit 121 generates data D indicating features of the file F on the basis of the data contained in the file F. The data D includes a hash value obtained by substituting the data contained in the file F into a predetermined hash function or data indicating the size of the file F, for example. In addition to performing the file transfer processing for the file F as described above, the application processing unit 121 sends the data D and identification information (e.g., file name, etc.) of the file F to the receiving-side computer 3 (application processing unit 151) using the control connection, for example.

On the other hand, the application processing unit 151 receives the data D and identification information of the file F from the sending-side computer 2 and stores them into the storage unit 16. The communication processing unit 152 notifies the application processing unit 121 of the end of transfer of the file F when the communication processing unit 152 reads out 0-byte data by executing the read function (f8 illustrated in FIG. 2). In TCP, when data including FIN is received, 0-byte data is stored into the receiving buffer. When this 0-byte data is read out by the read function, the receiving side detects that all the data to be received has arrived from the sending side. When notified by the communication processing unit 152 of the end of transfer of the file F, the application processing unit 151 calculates data D' indicating features of the data on the basis of the data stored in the buffer B2. The data D' is calculated in a similar manner to the data D. The data D' includes a hash value obtained by substituting the data stored in the buffer B2 into a predetermined hash function or data indicating the size of the data stored in the buffer B2, for example. Then, the application processing unit 151 reads the data D out of the storage unit 16 and determines whether or not the data D matches the calculated data D'. When it is determined that they do not match, the application processing unit 151 releases the buffer B2 and notifies, via the control connection for example, the sending-side computer 2 (application processing unit 121) that the data D does not match the data D'.

Then, the application processing units 121 and 151 notify each other of information (status) indicating whether or not the file transfer has successfully ended. These notifications are exchanged via the control connection, for example.

FIG. 5 illustrates an exemplary software configuration in the sending-side computer 2 included in the communication system 1. The receiving-side computer 3 has a similar software configuration. Hardware 21 (see FIG. 5) operates following a procedure specified by OS (operation system) 22. A network device 21a (communication card etc.) operates following a procedure specified by the device driver 22a (communication card driver etc.) for the network device 21a. The device driver 22a specifies a procedure for controlling the operation of the network device 21a according to the procedure specified by a protocol stack 22b (transport protocol software such as a protocol stack for TCP/IP protocol, for example). The protocol stack 22b specifies the procedure for causing the network device to perform processing as specified by the protocol. A socket API 22c (application transport layer interface) is a group of functions for which it is determined how the functions in the protocol stack are used in the application program 23 (or control program 24). The control program 24 indicates a communication procedure used for the application program 23. This procedure is based on a protocol such as FTP (file transfer protocol) in a file transfer communication used by the application program 23, for example. The control program 24 may be included in the application program 23.

Figure 6:
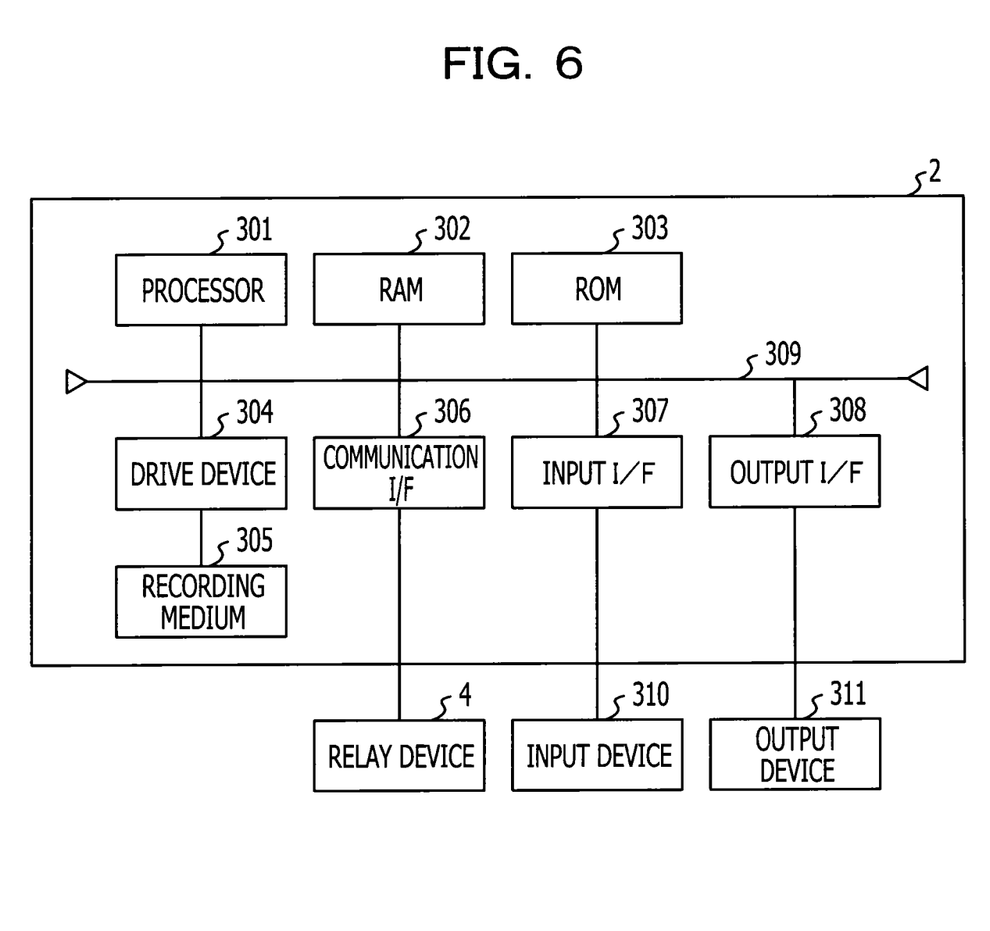
FIG. 6 illustrates an exemplary hardware configuration in the sending-side computer.

FIG. 6 illustrates an exemplary hardware configuration in the sending-side computer 2 included in the system 1. The receiving-side computer 3 has a similar hardware configuration, although the communication I/F included in the receiving-side computer 3 is connected to a relay device 5. The sending-side computer 2 includes, for example, a processor 301, RAM (random access memory) 302, ROM (read only memory) 303, drive device 304, recording medium 305, communication interface (I/F) 306 (network device 21a illustrated in FIG. 5), input interface (I/F) 307, output interface (I/F) 308, and so on. These hardware devices are connected via a bus 309. The communication I/F 306 is a device such as NIC (network interface card) that establishes communication via the relay device 4. The input interface 307 is connected to the input device 310 and transmits the input signals received from the input device 310 to the processor 301. The output interface 308 is connected to the output device 311 and causes the output device 311 to perform output operations as instructed by the processor 301.

The RAM 302 is a readable and writable memory device, including, for example, a semiconductor memory such as SRAM (static RAM) and DRAM (dynamic RAM). A memory device such as a flash memory may also be used instead of RAM. ROM 303 includes PROM (programmable ROM) or the like. The drive device 304 is a device that performs at least reading or writing of information in a recording medium 305. The recording medium 305 stores the information written by the drive device 304. The recording medium 305 is a recording medium such as a hard disk, CD (compact disc), DVD (digital versatile disc), or Blu-ray Disc, for example. In the sending-side computer 2, a drive device 304 and a recording medium 305, for example, are provided for each of the plurality of recording medium types.

The input device 310 is a device that sends input signals in response to operations. The input device 310 is a keying device such as a keyboard or a button attached to the body of the sending-side computer 2, or a pointing device such as a mouse or a touch panel, for example. The output device 311 is a device that outputs information under the control of the sending-side computer 2. The output device 311 is an image output device (display device) such as a display or an audio output device such as a speaker, for example. An input/output device such as a touch screen, for example, is used as the input device 310 and output device 311.

The processor 301 reads a program out of the ROM 303 or recording medium 305 (see FIG. 4) into the RAM 302 and performs processing of the processing unit 12 following the procedure of the read-out program. The RAM 302 is then used by the processor as the working area and achieves the function of the storage unit 13. The function of the application processing unit 121 is achieved by the processor 301 performing processing following the procedure of the application program 23 or control program 24. The function of the communication processing unit 122 is achieved by the processor 301 performing processing following the procedure specified by the socket API 22c, protocol stack 22b, and device driver 22a.

The software and hardware configurations in the receiving-side computer 3 are equivalent to the software and hardware configurations in the sending-side computer 2 illustrated in FIG. 5 and FIG. 6. The functions of the communication unit 14, processing unit 15, storage unit 16, application processing unit 151, and communication processing unit 152 included in the receiving-side computer 3 are achieved by the hardware illustrated in FIG. 6 performing the program illustrated in FIG. 5 similarly to the sending-side computer 2.

With the above processing in the sending-side computer 2 and the receiving-side computer 3, the buffer for storing the received file is not left allocated in the receiving-side computer even if an error occurs in the file sending-side computer.

Figure 7:
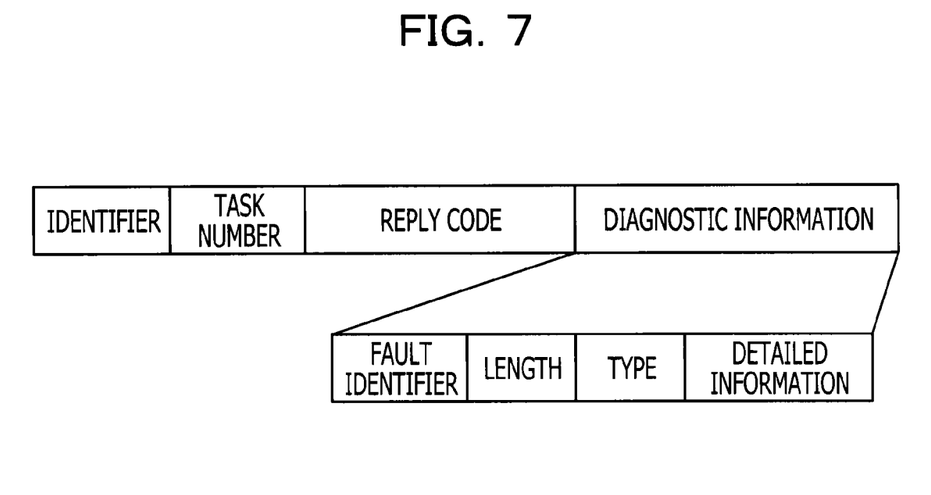
FIG. 7 illustrates an exemplary data structure of a status notification.

FIG. 7 illustrates an exemplary data structure of the status notification. The status notification includes a message type identifier, task number, reply code, and diagnostic information, for example. The identifier is information identifying status notification, for example. The task number includes information specified by a USER command (not illustrated) in the authentication for establishing a control connection, for example. The reply code includes information indicating whether or not the file transfer has normally ended, information indicating a temporary or permanent error, and information indicating a control or data connection-related error, a user authentication-related error, a file-related error, or other error, for example. The diagnostic information is used when further detailed information is sent. The diagnostic information is information indicating the amount of features of the file to be transferred and includes at least one of a fault identifier, length, type, and detailed information, for example. The detailed information includes information related to the cause of the error. The detailed information is used to cope with a system failure, for example, when it occurs. The fault identifier indicates a fault identifier of the detailed information, the length indicates the data size of the detailed information, and the type indicates the data type of the detailed information. By exchanging this type of status notification with each other, the sending-side computer 2 and the receiving-side computer 3 may determine whether or not the computer on the other end of the communication has determined that the data transfer has normally ended.

Figure 8:
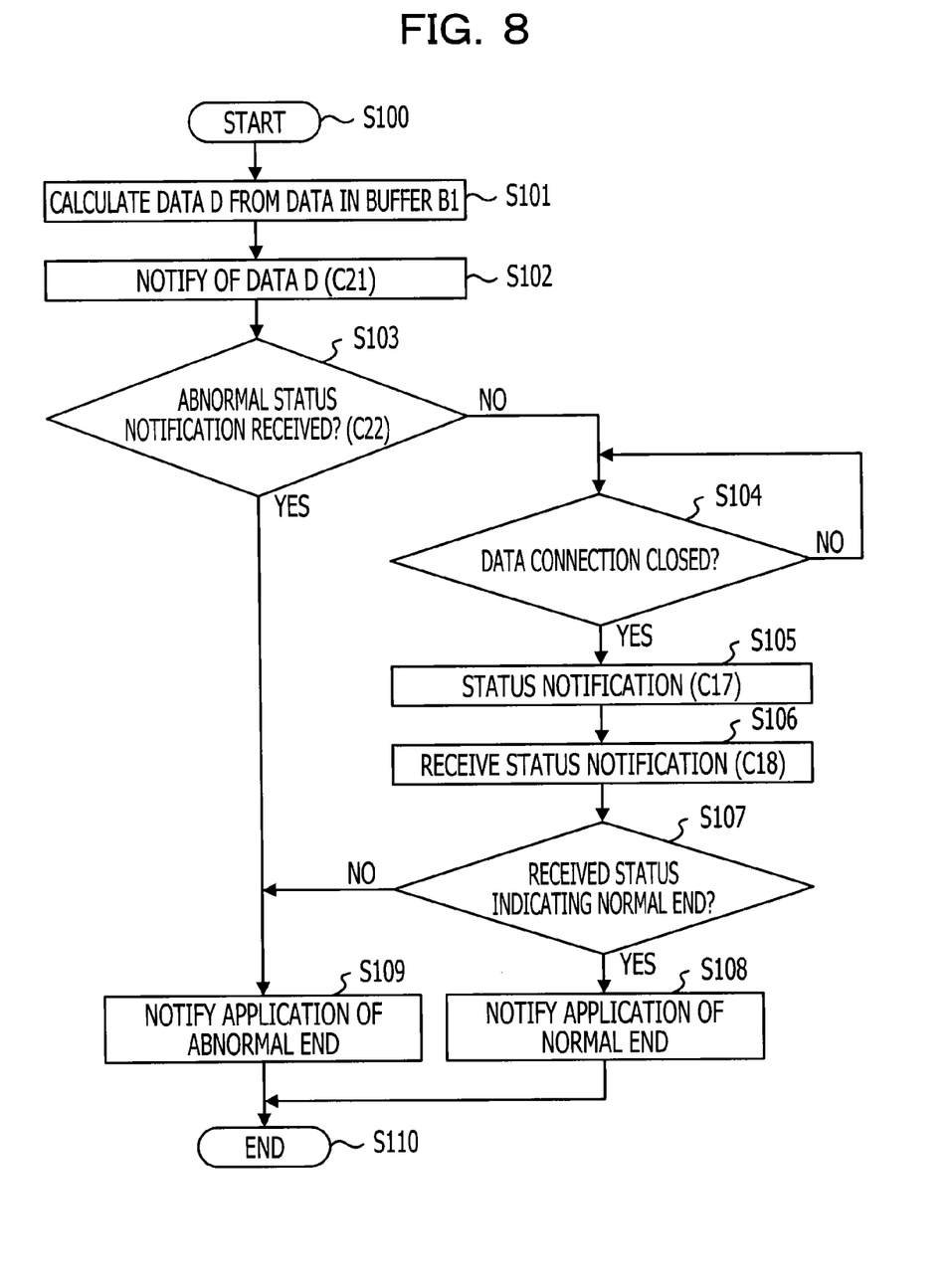
FIG. 8 is a exemplary flowchart illustrating a file transfer success/failure decision.

A file transfer success/failure decision will now be described. FIG. 8 illustrates a flow for file transfer success/failure decision in the sending-side computer 2. First, when the file to be sent is stored in the buffer B1 (S100), the application processing unit 121 calculates data D on the basis of the data stored in the buffer B1 (S101). The data D is a hash value obtained by substituting the data stored in the buffer B1 into a predetermined hash function or information indicating the size of the data stored in the buffer B1, for example. Then, the application processing unit 121 sends the data D calculated in S101 to the file destination computer (S102). After processing in S102, the application processing unit 121 determines whether or not a status notification notifying of an abnormal end is received from the receiving-side computer 3 (S103). The decision in S103 may be YES when the application processing unit 121 receives data D' from the receiving-side computer 3 and the received data D' does not match the data D calculated in S101. When an abnormal end notification is received from the receiving-side computer 3 (S103: YES), the process in S109 is performed as described later. When no status notification is received from the receiving-side computer 3 before the data connection is closed or status notification indicating normal end is received (S103: NO), the application processing unit 121 determines whether or not the data connection is closed (S104). If the data connection is not closed (S104: NO), the application processing unit 121 determines again in S104. When the data connection is closed (S104: YES), the application processing unit 121 sends a status notification to the receiving-side computer 3 (S105). The status notification sent in S105 indicates whether or not the file transfer processing has normally ended before the data connection is closed. If the data stored in the buffer B1 fails to be stored in the sending buffer or another error occurs, for example, the application processing unit 121 sends a status notification of abnormal end. Receiving the status notification from the receiving-side computer 3 (S106) after processing in S105, the application processing unit 121 determines whether or not the status notification received in S106 indicates normal end (S107). If the status notification received in S106 indicates normal end (S107: YES), the application processing unit 121 replies with a notification of normal end in response to the file transfer request from the application program 23 (S108). If the status notification received in S106 does not indicate normal end (i.e., indicates abnormal end) (S107: NO), the application processing unit 121 performs processing in S109. In S109, the application processing unit 121 replies with a notification of abnormal end in response to the file transfer request from the application program 23 (S109). After processing in S108 or S109, the application processing unit 121 completes the file transfer success/failure decision (S110).

Figure 9:
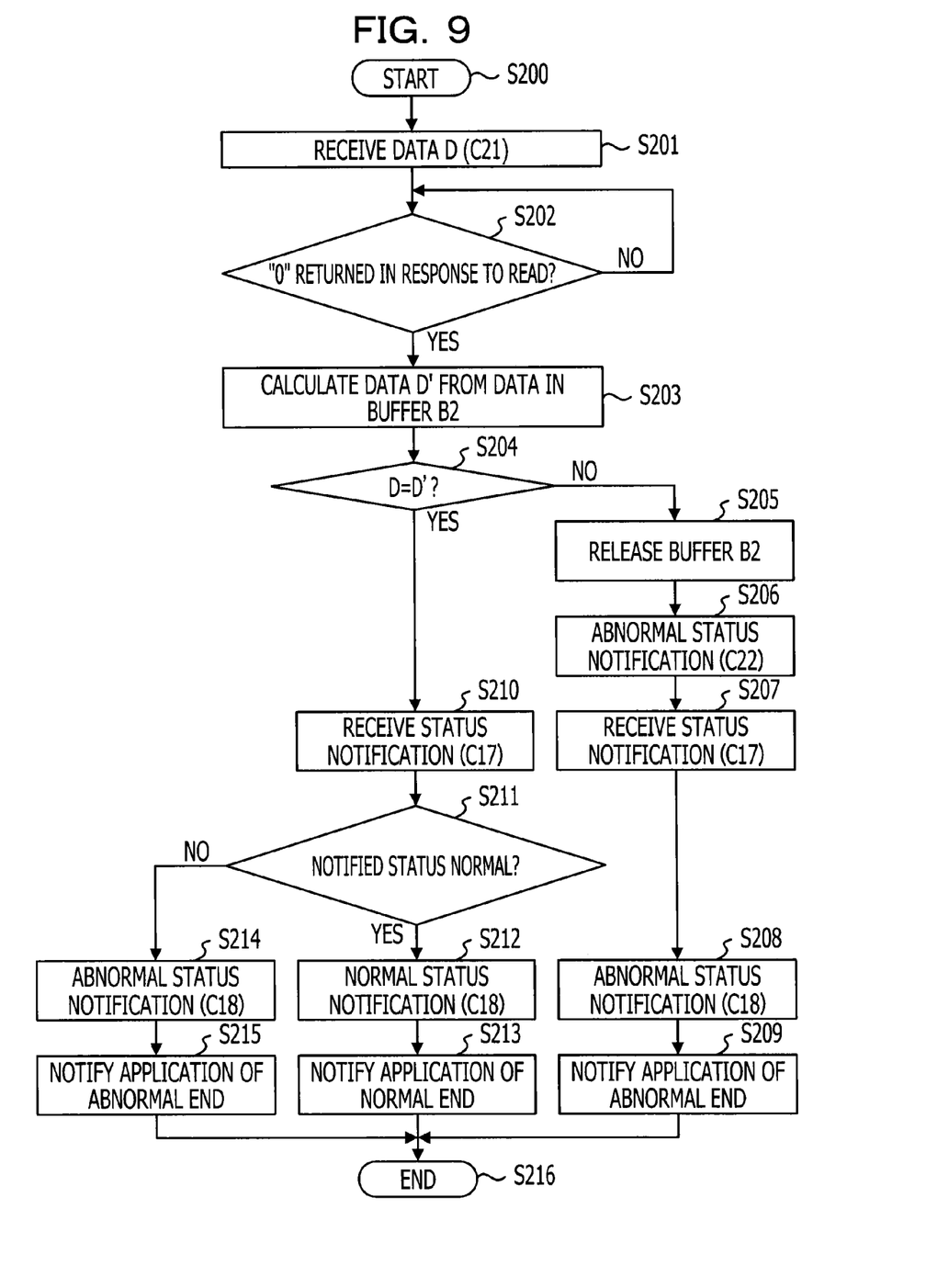
FIG. 9 is an exemplary flowchart illustrating a file transfer success/failure decision.

FIG. 9 illustrates a flow for file transfer success/failure decision in the receiving-side computer 3. Receiving a STOR command from the sending-side computer 2, the application processing unit 151 initiates a file transfer success/failure decision process (S200). First, the application processing unit 151 receives the data D calculated by the sending-side computer 2 (S201). Then, the application processing unit 151 determines whether or not 0-byte data has been read out by the read function executed by the communication processing unit 152 (S202). As a result of S202, if the 0-byte data has not been read out (S202: NO), the application processing unit 151 performs processing again in S202. If the 0-byte data has been read out in S202 (S202: YES), the application processing unit 151 calculates data D' indicating features of the data stored in the buffer B2 (S203). As described above, the data D' includes a hash value obtained by substituting the data stored in the buffer B2 into a predetermined hash function or information indicating the size of the data stored in the buffer B2, for example. The application processing unit 151 uses the same hash function as the one used for calculating the data D by the application processing unit 121 in the sending-side computer 2. Next, the application processing unit 151 determines whether or not the data D received in S201 is same as the data D' calculated in S203 (S204). As a result of S204, if the data D does not match the data D' (S204: NO), the application processing unit 151 releases the buffer B2 that has been allocated for file reception (S205). Then, the application processing unit 151 sends a status notification of the abnormal end of file transfer to the sending-side computer 2 (S206). When receiving a status notification from the sending-side computer 2 (S207), the application processing unit 151 sends a status notification of abnormal end to the sending-side computer 2 (S208). Either S206 or S207 and S208 may be performed. Then, the application processing unit 151 notifies the application program 23 operating in the receiving-side computer 3 of the abnormal end (S209). Subsequently, the application processing unit 151 completes the file transfer success/failure decision (S216).

On the other hand, as a result of S204, if the data D matches the data D' (S204: YES), the application processing unit 151 receives a status notification from the sending-side computer 2 (S210). Next, the application processing unit 151 determines whether or not the status notification received in S210 indicates normal end (S211). If the notification received in S210 indicates normal end in S211 (S211: YES), the application processing unit 151 sends a status notification of normal end to the sending-side computer 2 (S212). Then, the application processing unit 151 notifies the application program 23 operating in the receiving-side computer 3 of the normal end (S213). Subsequently, the application processing unit 151 completes the file transfer success/failure decision (S216).

As a result of S211, if the notification received in S210 indicates an abnormal end (S211: NO), the application processing unit 151 sends a status notification of abnormal end to the sending-side computer 2 (S214). Then, the application processing unit 151 notifies the application program 23 operating in the receiving-side computer 3 of the abnormal end (S215). Subsequently, the application processing unit 151 completes the file transfer success/failure decision (S216).

In the file transfer success/failure decision flows illustrated in FIGS. 8 and 9, the process in S108 may be performed if the process in S106 is not performed before a predetermined time period elapses after the application processing unit 121 performs processing in S105, for example. The reason why the processes in S106 are not performed is that, even if the status notification (C18 in FIG. 1) sent in S208, S212, or S214 is delayed due to a network load, for example, it has been confirmed in S103 that the file to be transferred is stored in the buffer B2 in the receiving-side computer 3. Consequently, the data transfer may be completed without delay even if the status notification is delayed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control system comprising:
a first computer; and
a second computer, wherein
the first computer includes:
a communication interface device; and
a first processor configured to control the communication interface device to transmit first data and first feature information indicating a feature of the first data to the second computer, and
the second computer includes:
a memory that has a storage area allocated to store second data received from the first computer; and
a second processor configured to:
in a case of detecting that the transmission of the first data from the first computer has ended, determine whether the first feature information received from the first computer matches second feature information, indicating a feature of the received data stored in the storage area, calculated based on the second data stored in the storage area, wherein the first processor is further configured to calculate a first hash value from contents of the first data, and
send the first hash value to the second computer as the first feature information, and
the second processor is further configured to
calculate a second hash value from contents of the second data, and
control the memory to release the storage area in response to the second processor making a determination that the second hash value does not match the first hash value, the second processor notifying the first computer that the transmission of the first data has failed based on the determination prior to the second computer receiving a transmitted error indication, from the first computer, which indicates that the first data was received in error.

2. The communication control system according to claim 1, wherein
the second computer further includes another communication interface device, and
the second processor is configured to control the another communication interface device to notify the first computer that the transmission of the first data has failed, when the first feature information does not match the second feature information.

3. The communication control system according to claim 2, wherein
the first processor is configured to control the communication interface device to resend to the second computer the first data and the first feature information, when the communication interface device notified by the first computer.

4. The communication control system according to claim 1, wherein
the first feature information is smaller in data size than the first data.

5. The communication control system according to claim 1, wherein
the first feature information is calculated by a given arithmetic operation based on the first data by the first computer, and the second feature information is calculated by the given arithmetic operation based on the second data by the second computer.

6. The communication control system according to claim 1, wherein
the second feature information is calculated on the basis of the second data, which is stored in the storage area, when information indicating the end of the first data is received from the first computer.

7. The communication control system according to claim 1, wherein
the first feature information is received by the second computer before the second computer determines that the transmission of the first data from the first computer has ended.

8. The communication control system according to claim 1, wherein
the second processor is configured to control the memory to release the storage area after storing the second data, which is stored in the storage area, into another storage area, when the first feature information matches the second feature information.

9. A communication control apparatus comprising:
a memory that has a storage area to store data and first feature information received from a computer, the first feature information indicating a feature of data to be transmitted from the computer; and
a processor configured to:
in a case of detecting that the transmission of the data to be transmitted from the computer has ended, determine whether the first feature information received from the computer matches second feature information, indicating a feature of the received data stored in the storage area, calculated based on the received data stored in the storage area, wherein
the first feature information received from the computer is generated, by the computer, by calculating a first hash value from contents of the first data and the first hash value is received from the computer as the first feature information, and
the processor is further configured to
calculate a second hash value from contents of the second data, and
control the memory to release the storage area in response to the processor notifying the computer that the transmission of the first data has failed based on a determination that the second hash value does not match the first hash value, the processor making the determination prior to the communication control apparatus receiving a transmitted error indication, from the computer, which indicates that the first data was received in error.

10. The communication control apparatus according to claim 9, further comprising:
a communication interface device, wherein
the processor is configured to control the communication interface device to notify the computer that the transmission of the data has failed when the first feature information does not match the second feature information.

11. The communication control apparatus according to claim 9, wherein
the first feature information is calculated by a given arithmetic operation based on the data to be transmitted by the computer, and
the second feature information is calculated by the given arithmetic operation based on the received data by the communication control apparatus.

12. The communication control apparatus according to claim 9, wherein
the second feature information is calculated on the basis of the received data, which is stored in the storage area, when information indicating the end of the data to be transmitted from the computer is received.

13. A communication control method comprising:
storing data and first feature information received from a first computer in a storage area of a memory of a second computer, the first feature information indicating a feature of data to be transmitted from the first computer;
in a case of detecting that the transmission of the data to be transmitted from the first computer has ended, determining whether the first feature information received from the first computer matches second feature information, indicating a feature of the received data stored in the storage area, calculated based on the received data stored in the storage area; and
controlling, by a processor of the second computer, the memory to release the storage area when second feature information does not match the received first feature information, wherein
the first feature information received from the first computer is generated, by the first computer, by calculating a first hash value from contents of the first data and the first hash value is received from the first computer as the first feature information,
the second feature information is generated, by the second computer, by calculating a second hash value from contents of the second data, and
the controlling, by the processor, to control the memory to release the storage area is performed in response to the second computer making a determination that the second hash value does not match the first hash value, the second computer notifying the first computer that the transmission of the first data has failed based on the determination being made by the second computer prior to the second computer receiving a transmitted error indication, from the first computer, which indicates that the first data was received in error.

14. The communication control method according to claim 13, further comprising:
notifying the first computer that the transmission of the data has failed, when the first feature information does not match the second feature information.

15. The communication control method according to claim 13, wherein
the first feature information is calculated by a given arithmetic operation based on the data to be transmitted by the first computer, and
the second feature information is calculated by the given arithmetic operation based on the received data by the second computer.

16. The communication control method according to claim 13, wherein
the second feature information is calculated on the basis of the received data, which is stored in the storage area, when information indicating the end of the data to be transmitted from the first computer is received.

17. A non-transitory recording medium storing a communication control program that causes a computer to execute:
storing data and first feature information received from another computer in a storage area, the first feature information indicating a feature of data to be transmitted from the another computer; and
in a case of detecting that the transmission of the data to be transmitted from the another computer has ended, determining whether the first feature information received from the another computer matches second feature information, indicating a feature of the received data stored in the storage area, calculated based on the received data stored in the storage area; and
controlling the memory to release the storage area when second feature information does not match the received first feature information, wherein
the first feature information received from the another computer is generated, by the another computer, by calculating a first hash value from contents of the first data and the first hash value is received from the another computer as the first feature information, and
the communication control program cause the computer to calculate a second hash value from contents of the second data, and
control the memory release in response to the computer making a determination that the second hash value does not match the first hash value, the computer notifying the another computer that the transmission of the first data has failed based on the determination being made prior to the computer receiving a transmitted error indication, from the another computer, which indicates that the first data was received in error.

18. The non-transitory recording medium according to claim 17, wherein
the communication control program further causes the computer to execute notifying the another computer that the transmission of the data has failed, when the first feature information does not match the second feature information.

19. The non-transitory recording medium according to claim 17, wherein
the second feature information is calculated by a given arithmetic operation based on the data to be transmitted by the another computer, and
the second feature information is calculated by the given arithmetic operation based on the received data by the computer.

20. The non-transitory recording medium according to claim 17, wherein
the second feature information is calculated on the basis of the received data, which is stored in the storage area, when information indicating the end of the data to be transmitted from the another computer is received.

* * * * *